United States Patent
Melderis

(10) Patent No.: US 10,721,641 B2
(45) Date of Patent: Jul. 21, 2020

(54) DUPLICATE DETECTION AND ALERTING

(71) Applicant: SAP SE, Walldorf (DE)

(72) Inventor: Sergejs Melderis, Reston, VA (US)

(73) Assignee: SAP SE, Walldorf (DE)

( * ) Notice: Subject to any disclaimer, the term of this patent is extended or adjusted under 35 U.S.C. 154(b) by 99 days.

(21) Appl. No.: 16/124,685

(22) Filed: Sep. 7, 2018

(65) Prior Publication Data

US 2020/0084646 A1    Mar. 12, 2020

(51) Int. Cl.
*H04W 24/08* (2009.01)
*H04W 40/12* (2009.01)
*H04L 12/58* (2006.01)

(52) U.S. Cl.
CPC .......... *H04W 24/08* (2013.01); *H04L 51/30* (2013.01); *H04W 40/12* (2013.01)

(58) Field of Classification Search
CPC ........ H04W 24/08; H04W 40/12; H04L 51/30
See application file for complete search history.

(56) References Cited

U.S. PATENT DOCUMENTS

| 2008/0273600 A1* | 11/2008 | Singh | H04H 20/42 375/240.26 |
| 2014/0105033 A1* | 4/2014 | Vasseur | H04L 45/24 370/248 |

* cited by examiner

*Primary Examiner* — Afshawn M Towfighi
(74) *Attorney, Agent, or Firm* — Sterne, Kessler, Goldstein & Fox P.L.L.C.

(57) ABSTRACT

Disclosed herein are system, method, and computer program product embodiments for determining the quality of a route for sending messages. An embodiment operates by determining that a message in a stream of messages and associated with a route is a duplicate of a previous message associated with the route. The embodiment inserts a Boolean value into a duplicate detection queue associated with the route based on the determination. The embodiment calculates a route quality value for the route based on the duplicate detection queue. The embodiment then performs an action for the route based on the route quality value.

20 Claims, 5 Drawing Sheets

DUPLICATE DETECTION AND ALERTING

BACKGROUND

Companies, organizations, and government entities often send messages to their users. For example, they can send application-to-person (A2P) messages to their users. These entities can send messages to their users over various routes. Each route may vary by price and route quality. These entities often want to determine the quality of a particular route. This is because they want to know whether their messages are being received by their users in a reasonable amount of time. If not, these entities may want to send their messages over a different route. But these entities are often unable to determine the quality of a particular route. As a result, they do not know when they should send their messages over a different route.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for determining the quality of a route for sending messages.

Figure 1:
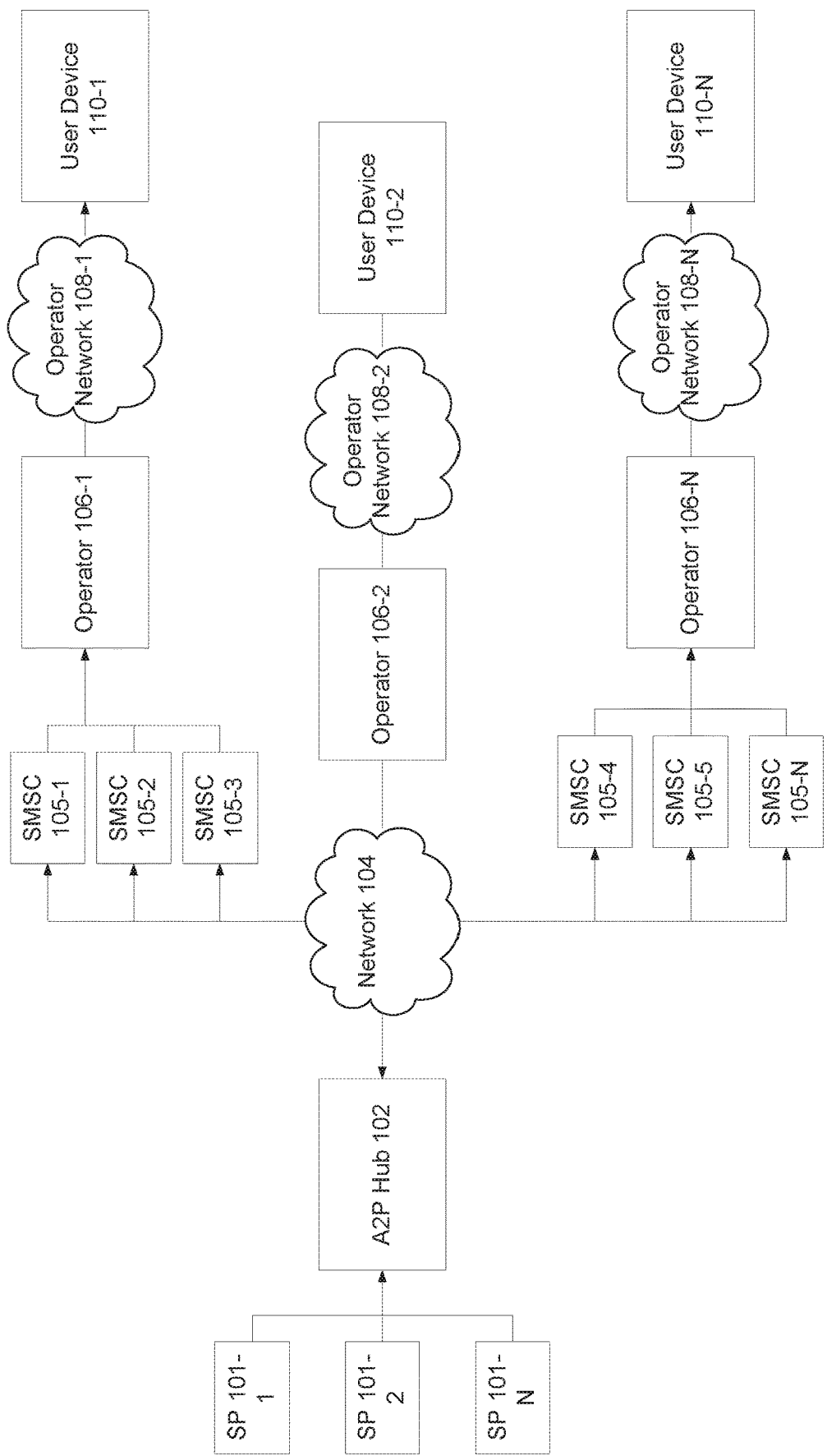
FIG. 1 is a block diagram of a messaging system that determines the quality of a route for sending messages, according to some embodiments.

FIG. 1 is a block diagram of a messaging system 100 that determines the quality of a route for sending messages, according to some embodiments. A message can be a short message service (SMS) message. However, as would be appreciated by a person of ordinary skill in the art, a message may be another type of message. For purposes of discussion, and without limitation, message system 100 is described with respect to sending short text messages such as, but not limited to, SMS messages.

Messaging system 100 can include one or more service providers (SP) 101, an application-to-person (A2P) hub 102, one or more Short Message Service Centers (SMSC) 105, one or more operators 106, and one or more user devices 110. A SP 101 can be an external entity that uses A2P hub 102 to send a short text message to a user device 110 (e.g., a mobile phone). A SP 101 can be a bank, hotel, airline, or various other type of entity as would be appreciated by a person of ordinary skill in the art. As would be appreciated by a person of ordinary skill in the art, a plurality of SP 101s may use A2P hub 102 to send short text messages to user devices 110.

A2P hub 102 can be an application or system that sends a short text message to a user device 110 on behalf of a SP 101. The short text message may contain informational content. For example, the short text message may contain a news alert, a One-Time Password (OTP), a transaction confirmation, or a personal identification number (PIN). The source address of the short text message can be a short code. A short code can be a short digit sequence associated with a SP 101 that utilizes A2P hub 102 to send short text messages. There can be a global association between a short code and a SP 101. The destination address of the short text message can be a telephone number (e.g., a Mobile Station International Subscriber Directory Number (MSISDN)) of a user device 110.

A2P hub 102 can route the short text message via one or more SMSCs 105 to an operator 106 for delivery to a user device 110. For example, A2P hub 102 can route a short text message over network 104 to a SMSC 105-1 that sends the short text message to operator 106-1 for delivery to a user device 110-1. Network 104 can include, without limitation, wired and/or wireless intranet, extranet, Internet, cellular, Bluetooth and/or any other local, short range, ad hoc, regional, global communications network, as well as any combination thereof. Operator 106 can then send the short text over an operator network 108 to the user device 110.

A SMSC 105 can be an intermediary SMSC that can route, forward, and/or store an incoming short text message for delivery to an operator 106. An operator 106 can be a network operator SMSC. An operator 106 can route, forward, and store an incoming short text message for delivery over operator network 108 to a user device 110.

An operator network 108 be a communications network (e.g., a mobile network) controlled or operated by a network operator such a AT&T, Sprint, or Verizon. An operator network 108 carries short text messages to and from user devices 110.

A user device 110 can be a mobile phone, tablet computer, wearable computer, or various other type of electronic device as would be appreciated by a person of ordinary skill in the art. A user device 110 can be configured to send or receive short text messages over an operator network 108.

To send a short text message to a user device 110, a SP 101 provides the short text message to A2P hub 102. A2P hub 102 can then identify a route to an operator 106. For example, where A2P hub 102 is not directly connected to an operator 106, A2P hub can identify a SMSC 105 that can route, forward, and/or store the short text message for delivery to an operator 106 which delivers the short text message to a user device 110. In other words, the route can be a particular SMSC 105. A2P hub 102 can then send the short text message over network 114 along the route to the operator 106 for delivery to the user device 110.

A2P hub 102 can send a short text message over network 114 to a operator 106 using different routes. Each route can have a different price or route quality.

In some embodiments, A2P hub 102 can use a primary route (e.g., SMSC 105) to send a short text message from a particular SP to a particular operator 106. However, multiple routes may be available to deliver the short text message from the particular SP to the particular operator 106. Each route can have a different price or route quality. The routes can be ordered by priority. The highest priority route can be used at all times. This can be the primary route. The use of multiple routes enables A2P hub 102 to switch quickly from a primary route to a secondary route based on route conditions (in which case the secondary route becomes the primary route).

For example, A2P hub 102 may use a first primary route to send short text messages from a first SP (e.g., Facebook) to an operator 106 (e.g., Verizon Wireless), and a second primary route to send short text messages from a second SP (e.g., WhatsApp) to the operator 106 (e.g., Verizon Wireless). For purposes of discussion, and without limitation, A2P hub 102 is described with respect to using a primary route to send a short text message from a particular SP to a particular operator 106. However, as discussed above, and as would be appreciated by a person of ordinary skill in the art, there may be a plurality of routes available to deliver a short text message from a particular SP (e.g., Facebook) to a particular operator 106 (e.g., Verizon Wireless).

A SP 101 may not know or care how A2P hub 102 routes short text messages. The SP 101 may merely provide the short text message and a destination phone number to A2P hub 102. A2P hub 102 can then determine how to route the short text message to the associated operator 106. A2P hub 102 may want to offer the best service possible to the SP 101 and ensure delivery of the short text message. But A2P hub 102 often does not know when a route is down, dropping short text messages, or suffering from transmission delay. A2P hub 102 therefore does not know when it should select a different route.

In some embodiments, this technological problem can be solved by detecting duplicate messages being sent over a route. For example, this technological problem can be solved by detecting duplicate multi-factor authentication messages being sent over a route.

A multi-factor authentication message can be short text message used to confirm a user's identity. For example, a user may attempt to login to a website associated with a SP as part of a multi-factor authentication scheme. The user may first enter their username and password. In response to receiving the user's login credentials, the SP can use A2P hub 102 to send a A2P short text message containing a one-time password (OTP) to the user's user device 110. The user may then enter the OTP at the website to confirm their identity.

The presence of duplicate multi-factor authentication messages on a route may be a strong indicator of the quality of the route. This is due to several characteristics of multi-factor authentication. First, multi-factor authentication messages often constitute a large portion of A2P traffic. Second, unlike a person-to-person (P2P) short text message or a A2P marketing message, a multi-factor authentication message can be sent as a direct result of a user action at a user device 110. Third, a user may patiently wait to receive a multi-factor authentication message from the SP 101 utilizing A2P hub 102. If the user fails to receive the multi-factor authentication message, the user may retrigger the multi-factor authentication process. For example, the user may request a new OTP from the website to confirm their identify. If the second multi-factor authentication message encounters a delivery failure or delay, the user may repeat the process resulting in a third message. Thus, the presence of duplicate multi-factor authentication messages can be a strong indicator of the quality of a route because the detection of duplicate messages likely means a user did not receive at least one of the multi-factor authentication messages. This may be because the multi-factor authentication messages were lost or delayed during transmission along the route.

The presence of duplicate multi-factor authentication messages can also be a strong indicator of the quality of a route because it is relatively easy to identify duplicate messages. In other words, each multi-factor authentication message may be the same, or very similar to, a previous multi-factor authentication message. For example, each multi-factor authentication message may have the same text except for a different OTP.

On the other hand, the presence of duplicate P2P short text messages or A2P marketing messages on a route may not be a strong indicator of the quality of the route. This is because a P2P short text message or A2P marketing message does not necessarily trigger a user action. As a result, there may be no way to determine whether the user did not receive the short text message, or the user simply ignored the short text message.

For purposes of discussion, and without limitation, embodiments herein are described with respect to sending multi-factor authentication messages. However, as would be appreciated by a person of ordinary skill in the art, embodiments may also P2P messages or other types of A2P messages.

The presence of duplicate multi-factor authentication messages can be a strong indicator of the quality of a route. But this is not always the case. For example, even though the text of a multi-factor authentication message may be the same, or very similar to, a previous multi-factor authentication message, this may still not be a strong indicator of the quality of a route. This is due to two reasons. First, even if a multi-factor authentication message has the same or very similar text as a previous multi-factor authentication message, it may not be a strong indicator of the quality of a route because the two messages may have been sent over different routes. Second, the previous multi-factor authentication message may have been sent a significant amount of time before the current multi-factor authentication message. As a result, the presence of a duplicate message may simply indicate that the user successfully performed a multi-factor authentication process at an earlier time. The greater the time delay between the previous and current multi-factor authentication messages, the harder it can be to make a determination about the quality of the route.

Thus, in view of the above, a duplicate message can be short text message that has the same SP, operator 106, destination user device 110, and almost the same message body as a short text message that was sent in the last few seconds or minutes. If a short text message is a duplicate, it is likely a multi-factor authentication messages. This is because a multi-factor authentication messages often have message bodies that are the same except for different OTPs, URLs, or both.

Figure 2:
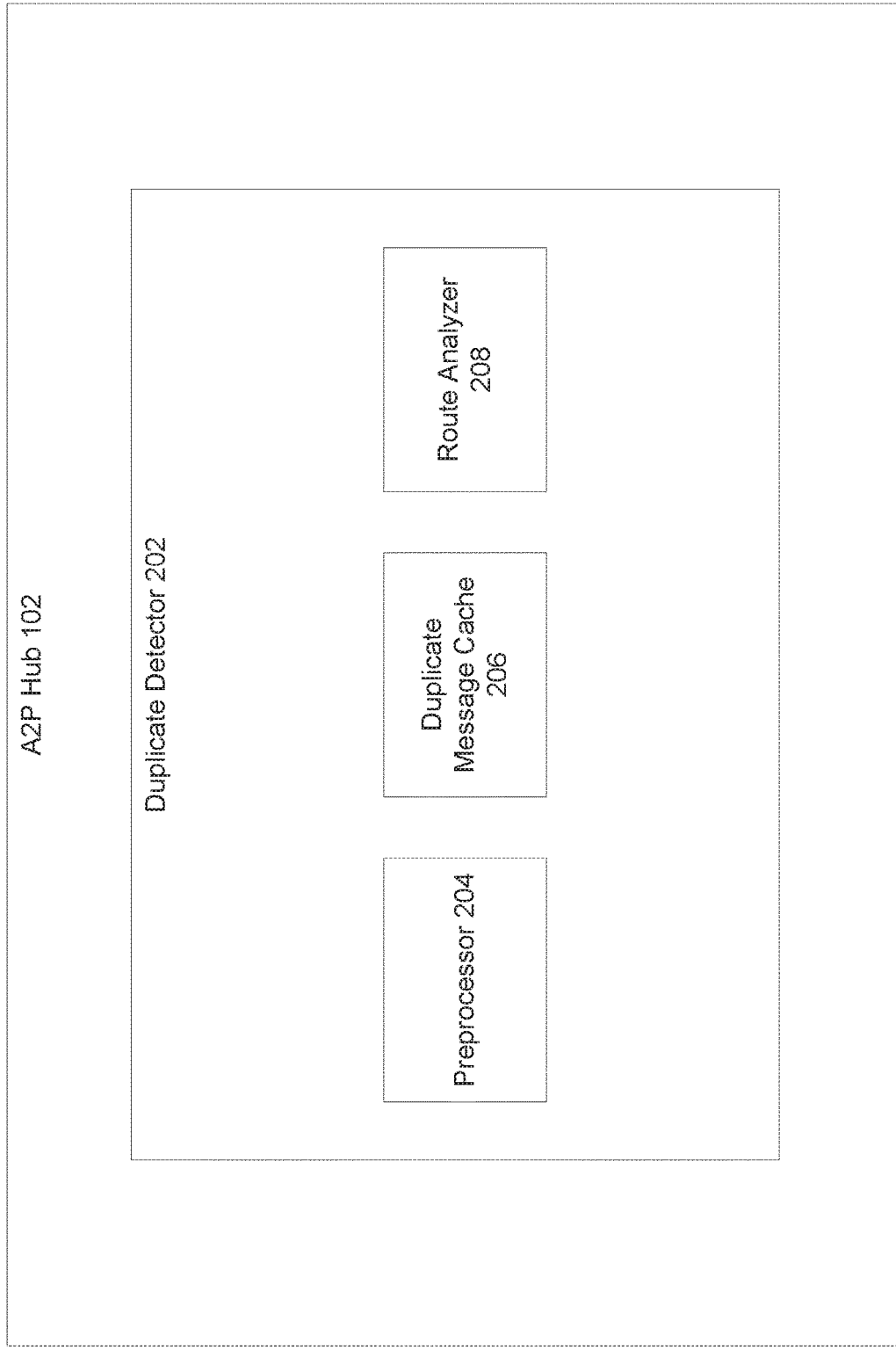
FIG. 2 is a block diagram of an application-to-peer (A2P) hub that determines the quality of a route for sending messages, according to some embodiments.

FIG. 2 is a block diagram of an A2P hub 102 that determines the quality of a route for sending short text messages, according to some embodiments. A2P hub 102 includes duplicate detector 202.

Duplicate detector 202 can detect duplicate short text messages being sent to a user device 110 along a particular route. Duplicate detector 202 includes a preprocessor 204, a duplicate message cache 206, and a route analyzer 208.

Duplicate detector 202 can receive a stream of short text messages. The stream of short text messages may include A2P messages. The stream of short text messages may also include P2P messages. However, as discussed above, it may not make sense to analyze P2P messages to determine the quality of a route. The stream of short text messages may include short text messages destined for different operators 106 and or different user devices 110. Duplicate detector 202 can detect duplicate short text messages for a particular route to determine the quality of the route.

Duplicate detector 202 can optionally use preprocessor 204 to preprocess the stream of short text messages. This can improve the detection of duplicate short text messages. This is because the preprocessing can decrease the number of textual differences between two short text messages. In some embodiments, preprocessor 204 can remove a common block containing variable text from a short text message. For example, preprocessor 204 can remove a OTP or personal identification number (PIN) from a short text message in the stream of short text messages. Similarly, preprocessor 204 can remove a URL from a short text message in the stream of short text messages. As would be appreciated by a person of ordinary skill in the art, preprocessor 204 can remove other common blocks or portions of the short text message to improve duplicate detection.

In some embodiments, preprocessor 204 can determine a short text message in the stream of short text messages is a multipart short text message. Preprocessor 204 can determine the short text message is a multipart short text message based on a header of the short text message. After determining the short text message is a multipart short text message, preprocess 204 can identify a subsequent short text message in the stream of short text messages that represents a multipart portion of the original short text message. Preprocessor 204 can perform this identification by analyzing the header of the subsequent short text message. Preprocessor 204 can then concatenate the original short text message and the subsequent short text message. Duplicate detector 202 can then analyze the concatenated short text message as discussed below. As would be appreciated by a person of ordinary skill in the art, preprocessor 204 can repeat the concatenation process for any number of short text messages that represent a multipart message.

After optionally preprocessing a short text message, duplicate detector 202 can perform duplicate detection. In some embodiments, duplicate detector 202 can perform duplicate detection using duplicate message cache 206. Duplicate message cache 206 can be a cache that contains short text messages previously sent to user devices 110. For example, duplicate message cache 206 can contain A2P messages previously sent to user devices 110.

In some embodiments, duplicate message cache 206 can be an unbounded cache. In other words, duplicate message cache 206 can have no limit on the number of short text messages it can contain. This is often not an issue. This is because duplicate message cache 206 may not require much memory due to the relatively low throughput of A2P messages. Moreover, the short text messages in duplicate message cache 206 can be expired after a configurable amount of time and removed from duplicate message cache 206.

Duplicate detector 202 can perform duplicate detection by checking if there is a duplicate of a short text message in duplicate message cache 206. A duplicate message can be message that uses the same route, and has almost the same message body as a message that was sent a threshold amount of time ago. For example, in the case of using a single route to send a short text message from a particular SP 101 to a particular operator 106, a duplicate message can be short text message that has the same SP 101, operator 106, destination user device 110, and almost the same message body as a short text message that was sent in the last few seconds or minutes. For purposes of discussion, and without limitation, duplicate detector 202 is described with respect to a duplicate message being a short text message that has the same SP 101, operator 106, destination user device 110, and almost the same message body as a short text message that was sent a threshold amount of time ago.

Duplicate detector 202 can perform duplicate detection by comparing the metadata (e.g., SP, operator 106, destination user device 110) of a short text message to the metadata of a message in the duplicate message cache 206. Duplicate detector 202 can further perform duplicate detection by comparing the message body of a short text message to the message body of a message in the duplicate message cache 206. Duplicate detector 202 can further perform duplicate detection by performing the metadata and message body comparisons on messages in the duplicate message cache 206 that are less than a time-to-live (TTL) interval. As would be appreciated by a person of ordinary skill in the art, there are various ways to perform duplicate detection, and the associated comparisons.

In some embodiments, duplicate message cache 206 may be a hash table data structure. A key to duplicate message cache 206 may be a combination of a SP identifier (ID) and a destination address of a user device 110. For example, the SP ID may represent a particular SP 101 (e.g., WhatsApp). The destination address of the user device 110 may be a MSISDN. Thus, the key to the duplicate message cache 206 can be [SP ID, MSISDN].

Duplicate message cache 206 can map a particular key to a set of short text messages. For example, duplicate message cache 206 can map the key [SP ID, MSISDN] to short text messages previously sent from SP ID to a user device 110 having MSISDN.

The use of a hash table data structure for duplicate message cache 206 can improve duplicate detection performance. For example, duplicate detector 202 can quickly check whether a short text message has a duplicate in duplicate message cache 206 using an associated key.

By way of example, duplicate detector 202 can determine a SP ID and a MSISDN of a short text message in the stream of short text messages. Duplicate detector 202 can then perform a lookup of duplicate message cache 206 using [SP ID, MSISDN] as a key. If duplicate message cache 206 returns a Boolean value of false, there are no duplicate messages in duplicate message cache 206. This is because there are no short text messages in duplicate message cache 206 that were sent from SP ID to a user device 110 having MSISDN. In other words, no short text message was sent along a route from SP ID to a user device 110 having MSISDN. Thus, duplicate detector 202 can determine there are no duplicates in duplicate message cache 206 without having to compare the message body of the short text message to short text messages in duplicate message cache 206.

In some embodiments, duplicate detector 202 can insert the short text message into duplicate message cache 206 in response to a failed lookup. This can enable duplicate detector 202 to detect if subsequent short text messages are duplicates of the inserted short text message.

In some embodiments, the short text messages in duplicate message cache 206 expire after a time-to-live (TTL) interval. Duplicate detector 202 may ignore expired short text messages in duplicate message cache 206 during the duplicate detection process.

In some embodiments, the time-to-live interval can be user configurable. For example, the time-to-live interval can be 5 minutes. In this case, duplicate detector 202 may ignore a short text message in duplicate message cache 206 after the short text message has been present in duplicate message cache 206 for more than 5 minutes. In some embodiments, short text messages may be removed from duplicate message cache 206 after expiring to reduce memory usage.

In some embodiments, duplicate detector 202 may reset the TTL interval for a short text message present in duplicate message cache 206 in response to the lookup of a subsequent duplicate short text message in duplicate message cache 206.

The use of a TTL interval for a short text message in duplicate message cache 206 can improve the detection of duplicate short text messages. For example, if a previous multi-factor authentication message was sent a significant amount of time before a subsequent multi-factor authentication message, this may simply indicate that a user successfully performed a multi-factor authentication process at an earlier time. While the previous and subsequent messages may have common metadata, and may have the same or very similar message bodies, the significant amount of time between the two messages likely indicates these messages relate to separate multi-factor authentication operations. The use of a TTL interval can ensure that previous and subsequent messages refer to the same multi-factor authentication operation.

In some embodiments, if duplicate detector 202 detects a short text message shares metadata with a set of unexpired short text messages in duplicate message cache 206, duplicate detector 202 can compare the message body of the short text message to the message bodies of the set of unexpired short text messages. As would be appreciated by a person of ordinary skill in the art, duplicate detector 202 can compare the message body of the short text message to the message bodies of the set of unexpired short text messages using various text matching algorithms.

Duplicate detector 202 can compare the message body of the short text message to the message bodies of the set of unexpired short text messages using various text matching algorithms. To improve duplication detection performance duplicate detector 202 can use text matching algorithms that do not consider the semantic meaning of the message body of the short text message.

In some embodiments, duplicate detector 202 can compare the message body of the short text message to the message bodies of the set of unexpired short text messages using a Levenshtein distance algorithm. For example, duplicate detector 202 can calculate the number to deletions, insertions, or substitutions needed to transform the message body of the short text message to each of the message bodies of the set of unexpired short text messages. If the number of deletions, insertions, or substitutions is less than a threshold value, duplicate detector 202 can indicate that the short text message is a duplicate of one of the set of unexpired short text messages.

In some embodiments, duplicate detector 202 can compare the message body of the short text message to the message bodies of the set of unexpired short text messages using a longest common string algorithm. For example, duplicate detector 202 can calculate the longest common string between the short text message and each of the message bodies of the set of unexpired short text messages. If the size of the longest common string is greater than a threshold value, duplicate detector 202 can indicate that the short text message is a duplicate of one of the set of unexpired short text messages.

In some embodiments, duplicate detector 202 can compare the message body of the short text message to the message bodies of the set of unexpired short text messages by identifying the number of different words between the short text message and each of the message bodies of the set of unexpired short text messages. If the number of words is less than a threshold value, duplicate detector 202 can indicate that the short text message is a duplicate of one of the set of unexpired short text messages.

As discussed above, the presence of duplicate short text messages on a route may be a strong indicator of the quality of the route. To determine the quality of the route, the number of duplicate short text messages on the route can be counted and analyzed. To perform this analysis, duplicate detector 202 can output a stream of Boolean values for the stream of short text messages. Duplicate detector 202 can further partition the stream of Boolean values by route. For example, in the case where there is a single primary route between any SP 101 and any operator 106, duplicate detector 202 can partition the stream of Boolean values by SP 101 and operator 106. Each stream of Boolean values for a given route can then be analyzed by route analyzer 208.

Each Boolean value in a stream of Boolean values for a given route can indicate whether an associated short text message in the stream of short text messages is a new message or a duplicate on the route. A Boolean value of '1' can indicate the short text message is a duplicate, and the value '0' can indicate the short text message is a new message. As discussed above, the detection of a duplicate is an indirect indication that the previous short text message was not received by a user device 110.

In some embodiments, duplicate detector 202 can insert the stream of Boolean values for a particular route into an associated duplication detection queue. For example, where there is a single primary route between any SP 101 and any operator 106, duplicate detector 202 can insert the stream of Boolean values associated with a particular stream of short text messages from the particular SP 101 to the particular operator 106, into an associated duplication detection queue.

Figure 3:
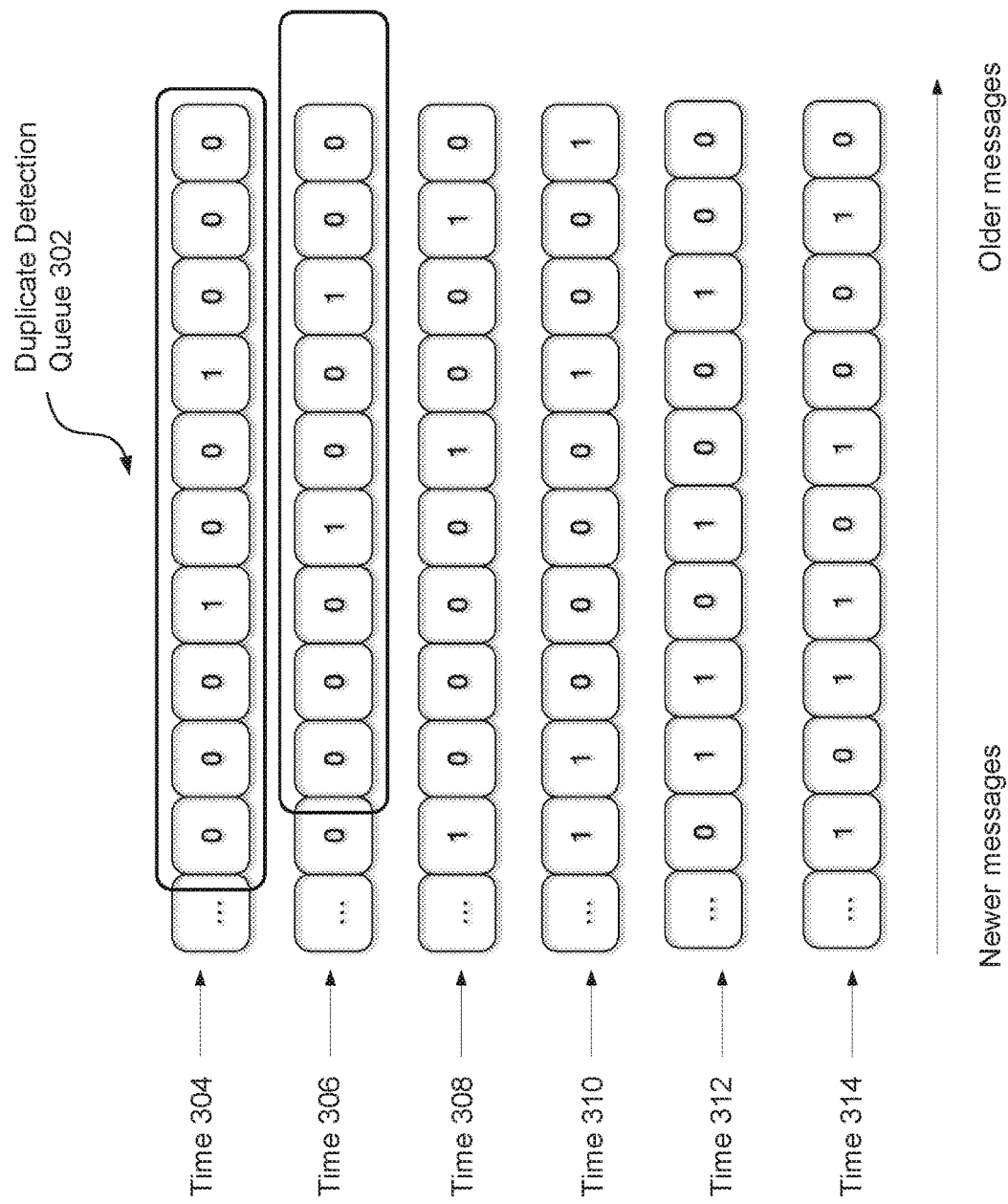
FIG. 3 is a block diagram of a duplicate detection queue that stores indications of detected duplicate messages for a particular route, according to some embodiments.

FIG. 3 is a block diagram of a duplicate detection queue 302 that stores a stream of Boolean values for a particular route, according to some embodiments. Duplicate detector 202 can insert a Boolean value into duplicate detection queue 302 in response to detecting that an associated short text message is a duplicate of a previous short text message sent along the particular route.

In some embodiments, duplicate detection queue 302 can be a fixed size queue. As would be appreciated by a person of ordinary skill in the art, duplicate detection queue 302 can be a user configurable size. In some embodiments, duplicate detection queue 302 can be a bit array to reduce memory usage.

Duplicate detector 202 can insert a Boolean value into duplicate detection queue 302 after each lookup in duplicate message cache 206. For example, in FIG. 3 at time 304, duplicate detector 202 inserts a '0' into duplicate detection queue 302 in response to detecting that an associated short text message is not a duplicate. Duplicate detector 202 can also remove the oldest Boolean value from duplicate detection queue 302 in response to each lookup in duplicate message cache 206.

In some embodiments, in response to each insertion and removal of a Boolean value from duplicate detection queue 302, route analyzer 208 can calculate a route quality value for duplicate detection queue 302. The route quality value can represent a route quality of the route. Route analyzer 208 can detect an anomaly with the route based on the route quality value. For example, route analyzer 208 can detect that the route is down in response the route quality value crossing a threshold value.

In some embodiments, route analyzer 208 can calculate the route quality value as a sum the Boolean values in duplicate detection queue 302. Route analyzer 208 can also detect an anomaly with a route in response the route quality value crossing a threshold value (e.g., 5). For example, at time 304, route analyzer 208 calculates the sum of duplicate detection queue 302 as 2. At time 306, route analyzer 208 calculates the sum of duplicate detection queue 302 as 2. At time 308, route analyzer 208 calculates the sum of duplicate detection queue 302 as 3. At time 310, route analyzer 208 calculates the sum of duplicate detection queue 302 as 4. At time 312, route analyzer 208 calculates the sum of duplicate detection queue 302 as 4. At time 314, route analyzer 208 calculates the sum of duplicate detection queue 302 as 5. At time 314, route analyzer 208 can also detect an anomaly with the route in response to the route quality value crossing the threshold value (e.g., 5).

In some embodiments, route analyzer 208 can calculate the route quality value as a ratio of the number of Boolean values indicating duplicates against the number of Boolean values indicating non-duplicates. For example, at time 304, route analyzer 208 calculates the ratio as 2:8. At time 306, route analyzer 208 calculates the ratio as 2:8. At time 308, route analyzer 208 calculates the ratio as 3:7. At time 310, route analyzer 208 calculates the ratio as 4:6. At time 312, route analyzer 208 calculates the ratio as 4:6. And at time 314, route analyzer 208 calculates the ratio as 5:5.

In some embodiments, route analyzer 208 can calculate the route quality value using duplicate detection queue 302 represented as a moving window. For example, route analyzer 208 can calculate the route quality value using a moving window of size 10. In this case, route analyzer 208 can calculate route quality value using the 10 most recent Boolean values in duplicate detection queue 302. In some embodiments, route analyzer 208 can calculate various route quality values using moving windows of various size.

The size of the moving window can be user configurable. As would be appreciated by a person of ordinary skill in the art, the longer the window size, the longer it can take for route analyzer 208 to detect an anomaly with the route. On the other hand, the shorter the window size, the quicker route analyzer 208 can detect an anomaly with the route but the higher the false positive rate. Moreover, as would be appreciated by a person of ordinary skill in the art, the size of the window size can be chosen based on the current message throughput along the particular route. For example, a user can increase the window size based on a higher message throughput along the particular route.

In some embodiments, route analyzer 208 can calculate the route quality value as a weighted moving sum using a moving window. For example, route analyzer 208 can calculate the route quality value by assigning decreasing weights to each Boolean value in the moving window for the duplicate detection queue 302 starting at the newest Boolean value. Route analyzer 208 can then sum the weighted Boolean values.

In some other embodiments, route analyzer 208 can calculate the route quality value as a weighted moving average using a moving window. For example, route analyzer 208 can calculate the route quality value by assigning decreasing weights to each Boolean value in the moving window for the duplicate detection queue 302 starting at the newest Boolean value. Route analyzer 208 can then average the weighted Boolean values.

In some other embodiments, route analyzer 208 can calculate the route quality value as an exponential moving sum using a moving window. For example, route analyzer 208 can calculate the route quality value by assigning exponentially decreasing weights to each Boolean value in the moving window for the duplicate detection queue 302 starting at the newest Boolean value. Route analyzer 208 can then sum the weighted Boolean values.

In some other embodiments, route analyzer 208 can calculate the route quality value as an exponential moving average using a moving window. For example, route analyzer 208 can calculate the summary value by assigning exponentially decreasing weights to each Boolean value in the moving window for the duplicate detection queue 302 starting at the newest Boolean value. Route analyzer 208 can then average the weighted Boolean values.

As would be appreciated by a person of ordinary skill in the art, route analyzer 208 can calculate the route quality value using various other techniques. For example, route analyzer 208 can calculate the route quality value using a moving average of moving averages.

In some embodiments, route analyzer 208 can detect an anomaly with a route based on the route quality value crossing a threshold value. For example, route analyzer 208 can detect that the route is down in response the route quality value crossing a threshold value.

In some embodiments, route analyzer 208 can detect an anomaly with a route by first calculating a route quality value using a moving window for the duplicate detection queue 302. Route analyzer 208 can then determine whether the route quality value (e.g., the moving sum or ratio of the last W Boolean values) exceeds a mean of more than Z standard deviations. As would be appreciated by a person of ordinary skill in the art, W can be a function of the short text message throughput. Moreover, as would be appreciated by a person of ordinary skill in the art, Z can be a user configurable parameter.

In some embodiments, in response to detecting an anomaly with a route, route analyzer 208 can trigger an alert for the route. For example, route analyzer 208 can alert a user at A2P hub 102 that the route is down. Similarly, route analyzer 208 can alert a user at A2P hub 102 that the route is dropping short text messages or suffering from transmission delay.

In some embodiments, in response to detecting an anomaly with a route, route analyzer 208 can trigger an alert for the route and cause A2P hub 102 to change the route. For example, in response to detecting an anomaly with a route, route analyzer 208 can cause A2P hub 102 to select a new route between the SP 101 and the operator 106 associated with the route.

As discussed above, route analyzer 208 can detect an anomaly with a route by counting and analyzing detect duplicate messages for the route. In some cases, however, repetitive short text messages (e.g., SPAM) can trigger false alerts that a route is down. For example, this can occur when up to 30 of the same short text messages are being sent toward the same MSISDN in a very short time period.

In some embodiments, duplicate detector 202 can avoid triggering false alerts by incrementing a counter for each short text message that triggers a cache hit in duplicate message cache 206. If duplicate detector 202 detects that the counter exceeds a threshold value, duplicate detector 202 can avoid inserting a new Boolean value indicating the detecting of a duplicate message into a duplicate detection queue 302. For example, duplicate detector 202 avoid inserting a Boolean value into a duplicate detection queue 302 when there are more than three repetitions of the same short text message (e.g., the original message and two duplicates).

Figure 4:
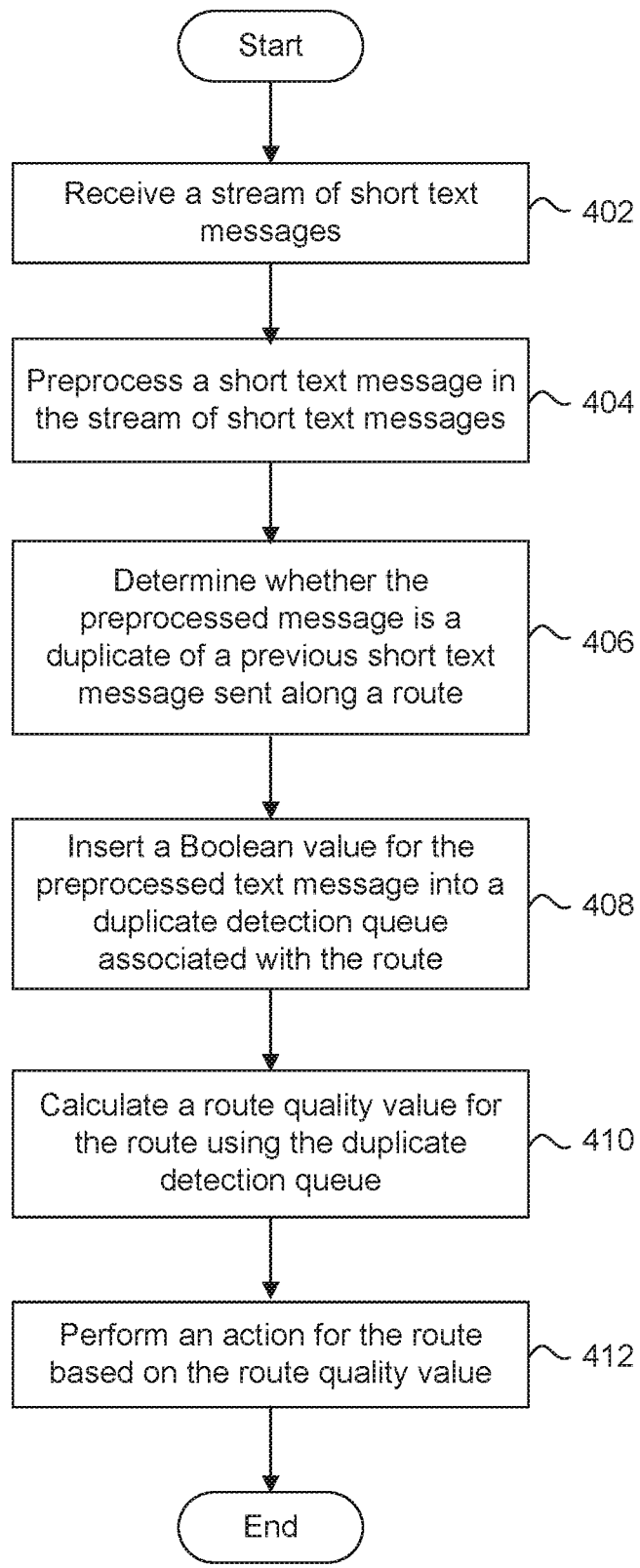
FIG. 4 is a flowchart illustrating a process determining the quality of a route for sending messages, according to some embodiments.

FIG. 4 is a flowchart for a method 400 for determining the quality of a route for sending short text messages, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 2 and 3. However, method 400 is not limited to those example embodiments.

In 402, duplicate detector 202 receives a stream of short text messages. For example, duplicate detector 202 can receive a stream of A2P SMS messages.

In 404, preprocessor 204 optionally preprocesses a short text message in the stream of short text messages. In some embodiments, preprocessor 204 can remove a common block containing variable text from the short text message. For example, preprocessor 204 can remove a OTP, PIN, or URL from the short text message in the stream of short text messages.

In 406, duplicate detector 202 determines whether the preprocessed short text message is a duplicate of a previous short text message sent along the same route. In other words, duplicate detector 202 determines whether the preprocessed short text message has the same route as the previous short text message, and almost the same message body as the previous short text message.

In some embodiments, duplicator detector 202 can perform duplicate detection using duplicate message cache 206. Duplicate message cache 206 can map a particular key to a set of short text messages. For example, duplicate message cache 206 can map a route associated with the preprocessed short text message to a set of short text messages previously sent along the route.

In some embodiments, duplicate message cache 206 can map a key of [SP ID, MSISDN] to short text messages previously sent from SP ID to a user device 110 having MSISDN. Duplicate detector 202 can then use the [SP ID, MSISDN] of the preprocessed short text message to check whether duplicate message cache 206 contains short text messages previously sent from SP ID to a user device 110 having MSISDN.

In some embodiments, the short text messages in duplicate message cache 206 expire after a TTL interval. Duplicate detector 202 may ignore expired short text messages in duplicate message cache 206 during the duplicate detection process.

In some embodiments, duplicate message cache 206 can return a Boolean value of false in response to a lookup by duplicate detector 202. This can mean there are no short text messages in duplicate message cache 206 that are duplicates of the preprocessed short text message. This is because duplicate message cache 206 contains no short text messages sent along the same route as the preprocessed short text message. This can enable duplicate detector 202 to determine there are no duplicates in duplicate message cache 206 without having to compare the message body of the preprocessed short text message to short text messages in duplicate message cache 206.

In some embodiments, duplicate message cache 206 can return a Boolean value of true in response to a lookup by duplicate detector 202. This can mean the preprocessed short text message shares a particular route with a set of short text messages in duplicate message cache 206. Duplicate detector 202 can then compare the message body of the preprocessed short text message to the message bodies of the set of short text messages. Duplicate detector 202 can compare the message body of the preprocessed short text message to the message bodies of the set of short text messages using various text matching algorithms including, but not limited to, a Levenshtein distance algorithm or a longest common string algorithm.

In some embodiments, if duplicate detector 202 determines the message body of the preprocessed short text message is the same or similar to a message body of a short text message of the set of short text messages, duplicate detector 202 can indicate that the preprocessed short text message is a duplicate. Duplicate detector 202 can also insert the preprocessed short text message into duplicate message cache 206. This can enable duplicate detector 202 to detect if subsequent short text messages are duplicates of the inserted preprocessed short text message.

In some embodiments, duplicate detector 202 can output a stream of Boolean values for the stream of short text messages as a result of the duplicate detection process. Duplicate detector 202 can further partition the stream of Boolean values by route.

For example, duplicate detector 202 can output a Boolean value for the preprocessed short text message. A Boolean value of '1' can indicate the preprocessed short text message is a duplicate, and the value '0' can indicate the preprocessed short text message is a new message.

In 408, duplicate detector 202 inserts the Boolean value for the preprocessed short text message into a duplicate detection queue 302 associated with the route of the preprocessed short text message. Duplicate detection queue 302 can be a fixed size queue. Duplicate detection queue 302 can also be implemented as a bit array to reduce memory usage.

In 410, route analyzer 208 calculates a route quality value for the route associated with the preprocessed short text message using the duplicate detection queue 302. The route quality value can indicate whether the route is down, dropping short text messages, or suffering from transmission delay. Route analyzer 208 can calculate the route quality value for the route in response to each insertion and removal of a Boolean value from the duplicate detection queue 302.

In some embodiments, route analyzer 208 can calculate the route quality value as a sum the Boolean values in the duplicate detection queue 302. In some other embodiments, route analyzer 208 can calculate the route quality value as a ratio of the number of Boolean values in the duplicate detection queue 302 indicating duplicates against the number of Boolean values indicating non-duplicates.

In some embodiments, route analyzer 208 can calculate the route quality value using a moving window associated with the duplicate detection queue 302. For example, route analyzer 208 can calculate the route quality value as a weighted moving average using the moving window. Route analyzer 208 can also calculate the route quality value as an exponential moving sum using the moving window. Route analyzer 208 can also calculate the route quality value as an exponential moving average using the moving window.

In 412, route analyzer 202 can cause A2P hub 102 to perform an action for the route associated with the preprocessed short text message based on the route quality value. A2P hub 120 can perform the action in response to route analyzer 202 detecting an anomaly with the route. For example, route analyzer 208 can detect that the route is down in response to the route quality value crossing a threshold value. Route analyzer 208 can then trigger an alert for the route. For example, route analyzer 208 can alert a user at A2P hub 102 that the route is down. Route analyzer 208 can further cause A2P hub 102 to reset the route, or select a new route between the SP 101 and the operator 106 associated with the route.

Figure 5:
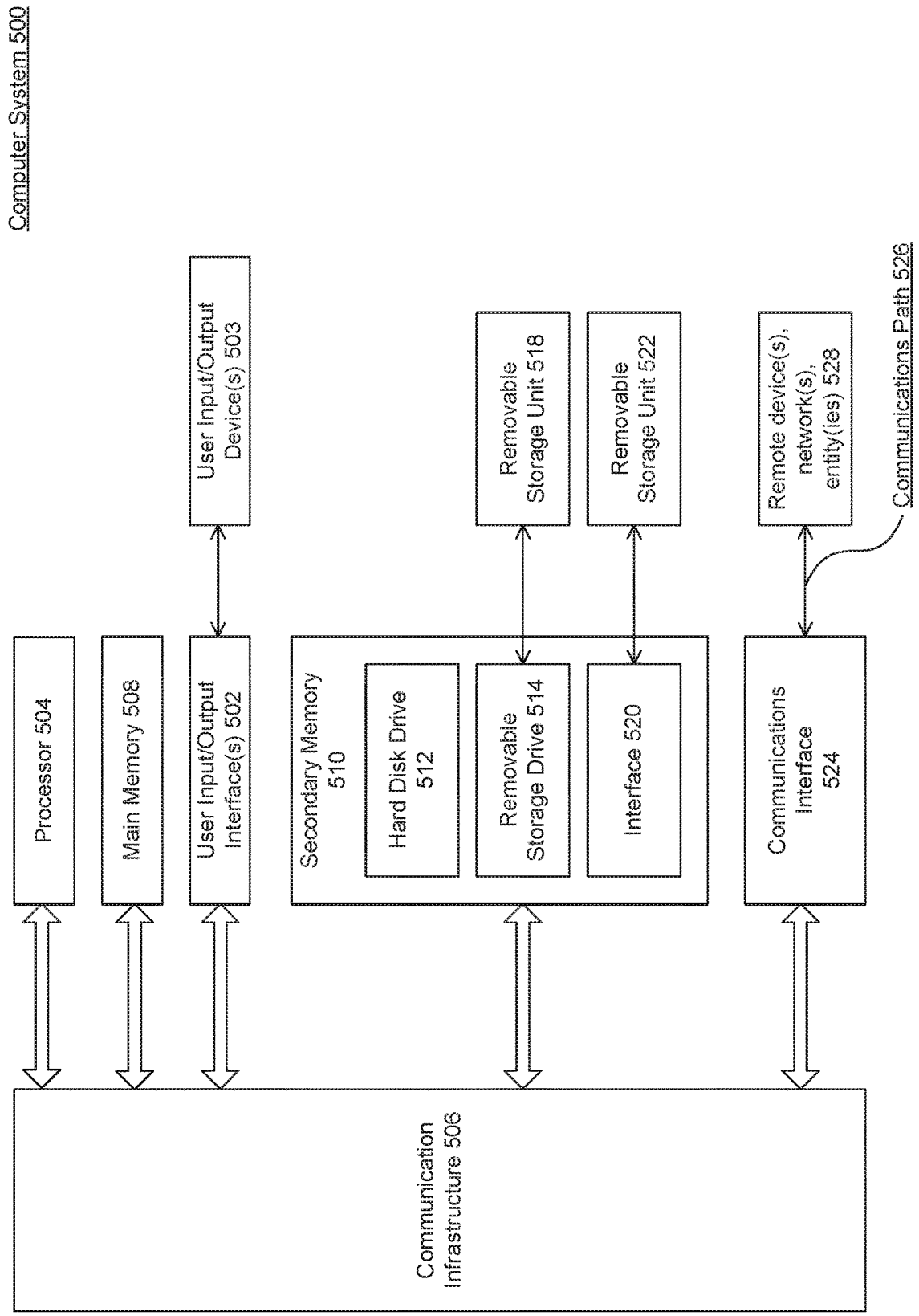
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for determining a route quality of a route, comprising:
   determining, by at least one processor, that a message in a stream of messages and associated with the route is a duplicate of a previous message associated with the route;
   inserting, by the at least one processor, a Boolean value into a duplicate detection queue associated with the route, wherein the Boolean value indicates the message is a duplicate of the previous message associated with the route;
   calculating, by the at least one processor, a route quality value for the route based on the duplicate detection queue; and
   performing, by the at least one processor, an action for the route based on the route quality value,
   wherein at least one of the determining, inserting, calculating, and performing are performed by one or more computers.

2. The method of claim 1, further comprising:
   removing, by the at least one processor, a common block containing variable text from the message.

3. The method of claim 1, further comprising:
   concatenating, by the at least one processor, the message with a second message in the stream of messages based on an indication in a header of the message that the message is part of a multipart message.

4. The method of claim 1, the determining further comprising:
   receiving, by the at least one processor, the previous message from a duplicate message cache based on the route; and
   comparing, by the at least one processor, a message body of a preprocessed message to a message body of the previous message, wherein the comparing comprises calculating a Levenshtein distance (LD) between the message body of the preprocessed message and the message body of the previous message, a longest common substring between the message body of the preprocessed message and the message body of the previous message, or a number of different words between the message body of the preprocessed message and the message body of the previous message.

5. The method of claim 4, wherein a message in the duplicate message cache is configured to expire after a time-to-live (TTL) interval.

6. The method of claim 1, the calculating further comprising:
   calculating, by the at least one processor, the route quality value of the route using a moving window for the duplicate detection queue.

7. The method of claim 1, the performing further comprising:
   issuing, by the at least one processor, an alert for the route based on the route quality value; or
   resetting, by the at least one processor, the route based on the route quality value.

8. A system, comprising:
   a memory; and
   at least one processor coupled to the memory and configured to:
      determine that a message in a stream of messages and associated with a route is a duplicate of a previous message associated with the route;
      insert a Boolean value into a duplicate detection queue associated with the route, wherein the Boolean value indicates the message is a duplicate of the previous message associated with the route;
      calculate a route quality value for the route based on the duplicate detection queue; and
      perform an action for the route based on the route quality value.

9. The system of claim 8, wherein the at least one processor is further configured to:
   remove a common block containing variable text from the message.

10. The system of claim 8, wherein the at least one processor is further configured to:
    concatenate the message with a second message in the stream of messages based on an indication in a header of the message that the message is part of a multipart message.

11. The system of claim 8, wherein to determine the at least one processor is configured to:
    receive the previous message from a duplicate message cache based on the route; and
    compare a message body of a preprocessed message to a message body of the previous message, wherein the comparing comprises calculating a Levenshtein distance (LD) between the message body of the preprocessed message and the message body of the previous message, a longest common substring between the message body of the preprocessed message and the message body of the previous message, or a number of different words between the message body of the preprocessed message and the message body of the previous message.

12. The system of claim 11, wherein a message in the duplicate message cache is configured to expire after a time-to-live (TTL) interval.

13. The system of claim 8, wherein to calculate, the at least one processor is configured to:
calculate the route quality value of the route using a moving window for the duplicate detection queue.

14. The system of claim 8, wherein to perform, the at least one processor is configured to:
issue an alert for the route based on the route quality value; or
reset the route based on the route quality value.

15. A non-transitory computer-readable device having instructions stored thereon that, when executed by at least one computing device, causes the at least one computing device to perform operations comprising:
determining that a message in a stream of messages and associated with a route is a duplicate of a previous message associated with the route;
inserting a Boolean value into a duplicate detection queue associated with the route, wherein the Boolean value indicates the message is a duplicate of the previous message associated with the route;
calculating a route quality value for the route based on the duplicate detection queue; and
performing an action for the route based on the route quality value.

16. The non-transitory computer-readable device of claim 15, the operations further comprising:
removing a common block containing variable text from the message.

17. The non-transitory computer-readable device of claim 15, the operations further comprising:
concatenating the message with a second message in the stream of messages based on an indication in a header of the message that the message is part of a multipart message.

18. The non-transitory computer-readable device of claim 15, the determining comprising:
receiving the previous message from a duplicate message cache based on the route; and
comparing a message body of a preprocessed message to a message body of the previous message, wherein the comparing comprises calculating a Levenshtein distance (LD) between the message body of a preprocessed message and the message body of the previous message, a longest common substring between the message body of the preprocessed message and the message body of the previous message, or a number of different words between the message body of the preprocessed message and the message body of the previous message.

19. The non-transitory computer-readable device of claim 15, the calculating comprising:
calculating the route quality value of the route using a moving window for the duplicate detection queue.

20. The non-transitory computer-readable device of claim 15, the performing comprising:
issuing an alert for the route based on the route quality value; or
resetting the route based on the route quality value.

* * * * *